United States Patent
Gupta et al.

(10) Patent No.: US 9,886,443 B1
(45) Date of Patent: Feb. 6, 2018

(54) DISTRIBUTED NFS METADATA SERVER

(71) Applicant: Nutanix, Inc., San Jose, CA (US)

(72) Inventors: Karan Gupta, San Jose, CA (US); Pavan Kumar Konka, Milpitas, CA (US); Alexander J. Kaufmann, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 386 days.

(21) Appl. No.: 14/570,307

(22) Filed: Dec. 15, 2014

(51) Int. Cl.
*G06F 17/30* (2006.01)

(52) U.S. Cl.
CPC .. *G06F 17/30117* (2013.01); *G06F 17/30203* (2013.01); *G06F 17/30233* (2013.01)

(58) Field of Classification Search
CPC ......... G06F 17/30117; G06F 17/30194; G06F 17/302; G06F 17/30203; G06F 17/30233
USPC .......................... 707/687, 690, 770, 827, 813
See application file for complete search history.

(56) References Cited

U.S. PATENT DOCUMENTS

| | | | | |
|---|---|---|---|---|
| 5,668,958 | A * | 9/1997 | Bendert | G06F 17/30067 707/E17.01 |
| 8,549,518 | B1 | 10/2013 | Aron et al. | |
| 8,601,473 | B1 | 12/2013 | Aron et al. | |
| 8,700,563 | B1 * | 4/2014 | Thomson | G06F 17/30171 707/607 |
| 8,850,130 | B1 | 9/2014 | Aron et al. | |
| 2003/0069902 | A1 * | 4/2003 | Narang | G06F 17/30551 |
| 2005/0120025 | A1 * | 6/2005 | Rodriguez | G06F 17/30073 |
| 2005/0262166 | A1 * | 11/2005 | Rajeev | G06F 17/30581 |
| 2011/0153606 | A1 * | 6/2011 | Kim | G06F 17/302 707/737 |
| 2011/0225126 | A1 * | 9/2011 | Daniels | G06F 17/30014 707/690 |
| 2015/0066852 | A1 * | 3/2015 | Beard | G06F 17/30079 707/625 |
| 2016/0259783 | A1 * | 9/2016 | Takata | G06F 3/06 |
| 2016/0359955 | A1 | 12/2016 | Gill et al. | |

OTHER PUBLICATIONS

U.S. Appl. No. 14/610,285, filed Jan. 30, 2015, 44 pages.
U.S. Appl. No. 14/921,974, filed Oct. 23, 2015, 60 pages.
U.S. Appl. No. 15/174,977, filed Jun. 6, 2016, 105 pages.
U.S. Appl. No. 15/071,488, filed Mar. 16, 2016, 46 pages.
U.S. Appl. No. 14/985,268, filed Dec. 30, 2015, 53 pages.
U.S. Appl. No. 15/176,731, filed Jun. 8, 2016, 55 pages.

(Continued)

Primary Examiner — Hares Jami
(74) Attorney, Agent, or Firm — Vista IP Law Group, LLP

(57) ABSTRACT

An architecture for implementing a distributed metadata system in a virtualization environment comprising a plurality of servers, wherein each server may access and operate upon the entirety of the metadata in the virtualization environment. In response to a request received at a server to operate upon the metadata, existing metadata associated with the request is read by the server. The server performs one or more updates based upon the retrieved metadata, and attempts to update the corresponding stored metadata. In some embodiments, attempting to update the stored metadata comprises reading the metadata again and comparing it to the originally retrieved metadata, and performing the update only if the newly retrieved metadata matches the originally retrieved metadata.

33 Claims, 15 Drawing Sheets

(56) References Cited

OTHER PUBLICATIONS

U.S. Appl. No. 15/160,347, filed May 20, 2016, 62 pages.
U.S. Appl. No. 15/160,246, filed May 20, 2016, 61 pages.
U.S. Appl. No. 15/214,264, filed Jul. 19, 2016, 55 pages.
U.S. Appl. No. 15/186,400, filed Jun. 17, 2016, 72 pages.
U.S. Appl. No. 15/459,706, filed Mar. 15, 2017, 94 pages.

* cited by examiner

DISTRIBUTED NFS METADATA SERVER

FIELD

This disclosure concerns an architecture for implementing a distributed metadata server in a virtualization environment.

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

The underlying data in a virtualization environment may be in the form of a distributed file system (such as Network File System or NFS). In order to access particular data content, a client will often, through an NFS server, first consult the metadata for location information of the desired data content, before accessing the data content at the identified location. However, while clients are typically able to read from the metadata through a plurality of different data servers, in order to write or update the metadata of the distributed file system (e.g., rewrite metadata, change ownership of metadata, etc.), a dedicated metadata server is typically used. The dedicated metadata server serializes requests to modify or update the metadata, in order to preserve data integrity. However, because the dedicated metadata server functions as a chokepoint when processing metadata updates and modifications, the scalability of the system is limited.

Some approaches use a distributed metadata server by partitioning the metadata, and using different data servers to act as masters for different partitions. However, this presents difficulties for operations across different partitions of the metadata. In addition, partitioning the metadata may be inadequate from a load balancing standpoint, as it may not always be possible to determine how the requests to update the metadata will be distributed between different partitions of the metadata.

Therefore, there is a need for an improved approach to implementing distributed metadata in a virtualization environment.

SUMMARY

Some embodiments of the present invention provide an architecture for implementing a distributed metadata system in a virtualization environment. In one or more embodiments, a virtualization environment comprises a plurality of servers, wherein each server may access and operate upon the entirety of the metadata in the virtualization environment. In some embodiments, a request is received at a server to operate upon the metadata. In response to the request, existing metadata associated with the request is read by the server. The server performs one or more updates based upon the retrieved metadata, and attempts to update the corresponding stored metadata. In some embodiments, attempting to update the stored metadata comprises reading the metadata again and comparing it to the originally retrieved metadata, and performing the update only if the newly retrieved metadata matches the originally retrieved metadata.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION OF THE EMBODIMENTS OF THE INVENTION

Figure 1:
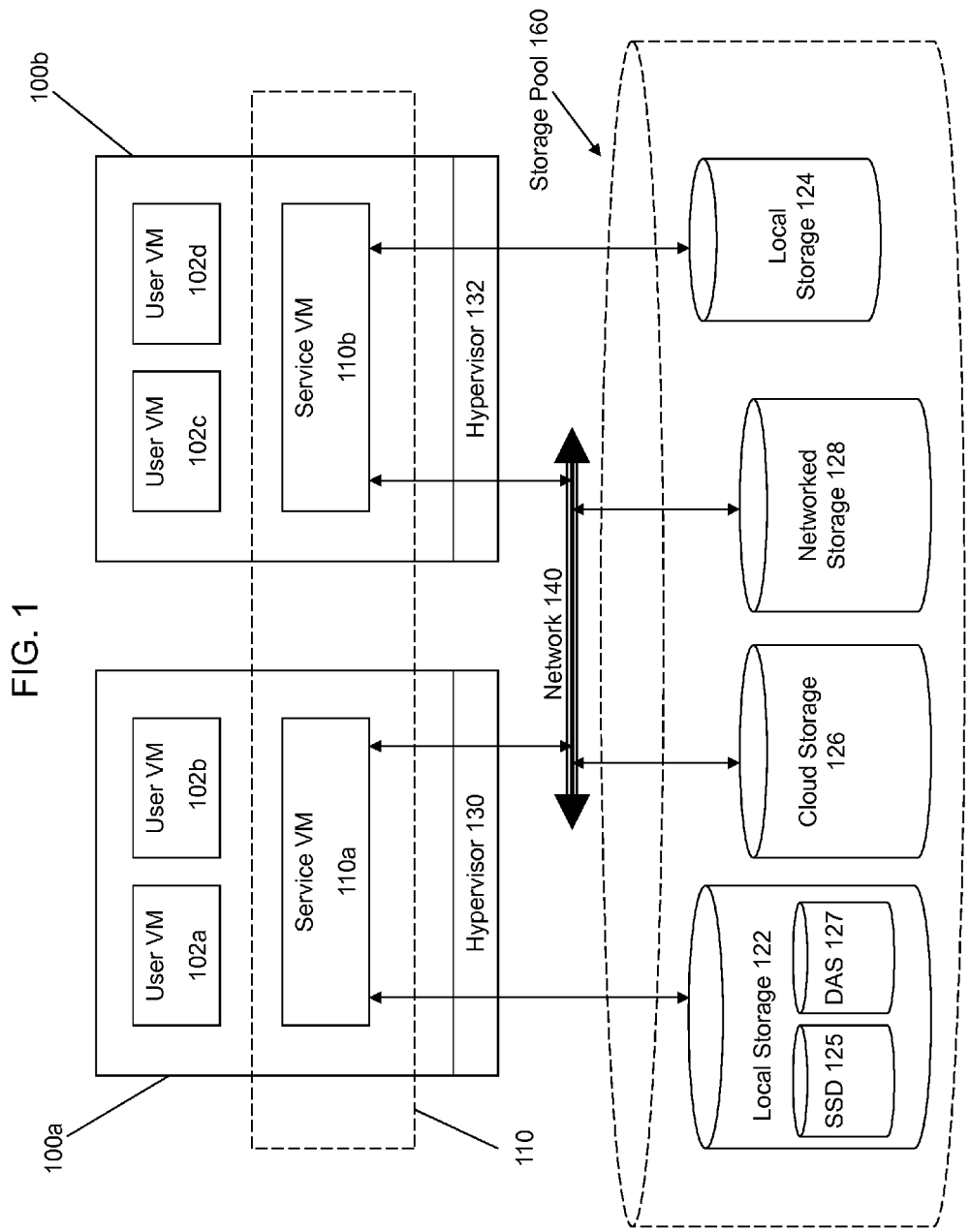
FIG. 1 illustrates an architecture for implementing storage management in a virtualization environment according to some embodiments.

Embodiments of the present invention provide an architecture for implementing a distributed metadata system in a virtualization environment. In some embodiments, a virtualization environment comprises a plurality of servers, wherein each server may access and operate upon the entirety of the metadata in the virtualization environment. In some embodiments, a request is received at a server to operate upon the metadata. In response to the request, existing metadata associated with the request is read by the server. The server performs one or more updates based upon the retrieved metadata, and attempts to update the corresponding stored metadata. In some embodiments, attempting to update the stored metadata comprises reading the metadata again and comparing it to the originally retrieved metadata, and performing the update only if the newly retrieved metadata matches the originally retrieved metadata FIG. 1 illustrates an architecture for implementing storage management in a virtualization environment according to some embodiments. The architecture of FIG. 1 can be implemented for a distributed platform that contains multiple servers 100a and 100b that manages multiple-tiers of storage. The multiple tiers of storage may include storage that is accessible through a network 140, such as cloud storage 126 or networked storage 128 (e.g., a SAN or "storage area network"). Unlike the prior art, the present embodiment also permits local storage 122/124 that is within or directly attached to the server and/or appliance to be managed as part of the storage pool 160. Examples of such storage include Solid State Drives (henceforth "SSDs") 125 or Hard Disk Drives (henceforth "HDDs" or "spindle drives") 127. These collected storage devices, both local and networked, form a storage pool 160. Virtual disks (or "vDisks") can be structured from the storage devices in the storage pool 160, as described in more detail below. As used herein, the term vDisk refers to the storage abstraction that is exposed by a Service VM to be used by a user VM. In some embodiments, the vDisk is exposed via iSCSI ("internet small computer system interface") or NFS ("network file system") and is mounted as a virtual disk on the user VM.

Each server 100a or 100b runs virtualization software, such as VMware ESX(i), Microsoft Hyper-V, or RedHat KVM. The virtualization software includes a hypervisor 130/132 to manage the interactions between the underlying hardware and the one or more user VMs 102a, 102b, 102c, and 102d that run client software.

A special VM 110a/110b is used to manage storage and I/O activities according to some embodiment of the invention, which is referred to herein as a "Service VM". This is the "Storage Controller" in the currently described architecture. Multiple such storage controllers coordinate within a cluster to form a single-system. The Service VMs 110a/110b are not formed as part of specific implementations of hypervisors 130/132. Instead, the Service VMs run as virtual machines above hypervisors 130/132 on the various servers 102a and 102b, and work together to form a distributed system 110 that manages all the storage resources, including the locally attached storage 122/124, the networked storage 128, and the cloud storage 126. Since the Service VMs run above the hypervisors 130/132, this means that the current approach can be used and implemented within any virtual machine architecture, since the Service VMs of embodiments of the invention can be used in conjunction with any hypervisor from any virtualization vendor.

Each Service VM 110a-b exports one or more block devices or NFS server targets that appear as disks to the client VMs 102a-d. These disks are virtual, since they are implemented by the software running inside the Service VMs 110a-b. Thus, to the user VMs 102a-d, the Service VMs 110a-b appear to be exporting a clustered storage appliance that contains some disks. All user data (including the operating system) in the client VMs 102a-d resides on these virtual disks.

Significant performance advantages can be gained by allowing the virtualization system to access and utilize local (e.g., server-internal) storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125. Further details regarding methods and mechanisms for implementing the virtualization environment illustrated in FIG. 1 are described in U.S. Pat. No. 8,601,473, which is hereby incorporated by reference in its entirety.

Distributed File Systems

In some embodiments, the underlying data in the virtualization environment is in the form of a distributed file system (e.g., an NFS file system). In order to access particular data content of the underlying data, a client accesses a server that reads from the metadata to obtain location or namespace information pertaining to the desired files or directories in order to access the content in the underlying data.

In some embodiments, namespace data for files and directories in the distributed file system are expressed in the metadata as index nodes (hereinafter referred to as inodes). In order to avoid cyclic dependency issues, directory and file inodes may be organized as a directed acyclic graph (DAG), although it is understood that in other embodiments, the metadata inodes may be organized as other types of graphs or structures. In addition, it is understood that although the present specification refers primarily to metadata represented as inodes for ease of example, it is understood that other embodiments may utilize different types of metadata schemes and representations.

Figure 2:
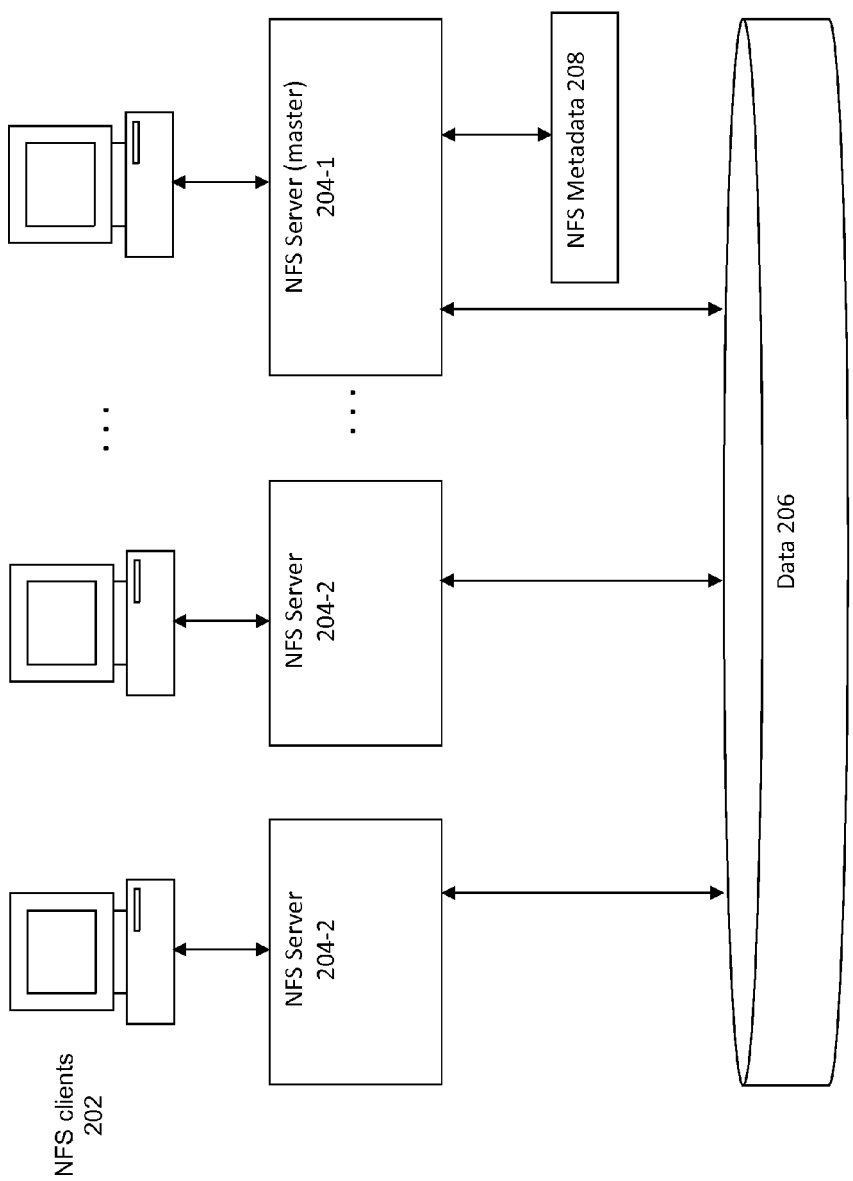
FIG. 2 illustrates a cluster in a virtualization environment configured as a distributed file system that uses a single metadata master server.

FIG. 2 illustrates a cluster in a virtualization environment configured as a distributed NFS file system that uses a single metadata master server. In the illustrated cluster, a plurality of clients 202 are able to utilize a plurality of servers 204 (which include a master server 204-1 and one or more slave servers 204-2) to operate upon underlying data 206. NFS metadata for underlying data 206 may be stored in a NFS metadata repository 208. It is understood that while metadata repository 208 and underlying data 206 are illustrated as singular entities for visualization purposes, metadata repository 208 and underlying data 206 may be distributed in any manner, and implemented using any number of databases or storage devices.

In some embodiments, in order for servers 204 to operate upon underlying data 206, the master server 204-1 is used to serialize requests by servers 204, granting servers 204 access (e.g., a lock) to a portion of underlying data that they seek to edit. In addition, while any of servers 204 may edit the underlying data 206 (once the necessary access or locks have been obtained), all commands for writing, creating, or updating metadata 208 must be processed through the master server 204-1.

Because the cluster illustrated in FIG. 2 only contains a single master metadata server 204-1 that serializes all requests to modify the metadata stored in metadata repository 208, a bottleneck is created when many different clients on different servers 204 seek to modify or update metadata in metadata repository 208. As a result, scalability of the cluster is limited, due to all metadata updates needing to be processed at a single master server.

One approach for relieving the bottleneck created by using one master server to update the metadata comprises partitioning or sharding the metadata (e.g., dividing the metadata graph into distinct sub-graphs), and using different data servers to act as masters for different partitions of the metadata. However, this presents difficulties for operations across different partitions of the metadata (e.g., moving a file or directory from one partition to another partition). In addition, partitioning the metadata may be inadequate from a load balancing standpoint, as it may not always be possible to determine how metadata update requests will be distributed between different the partitions of the metadata.

Distributed Metadata Servers

Figure 3:
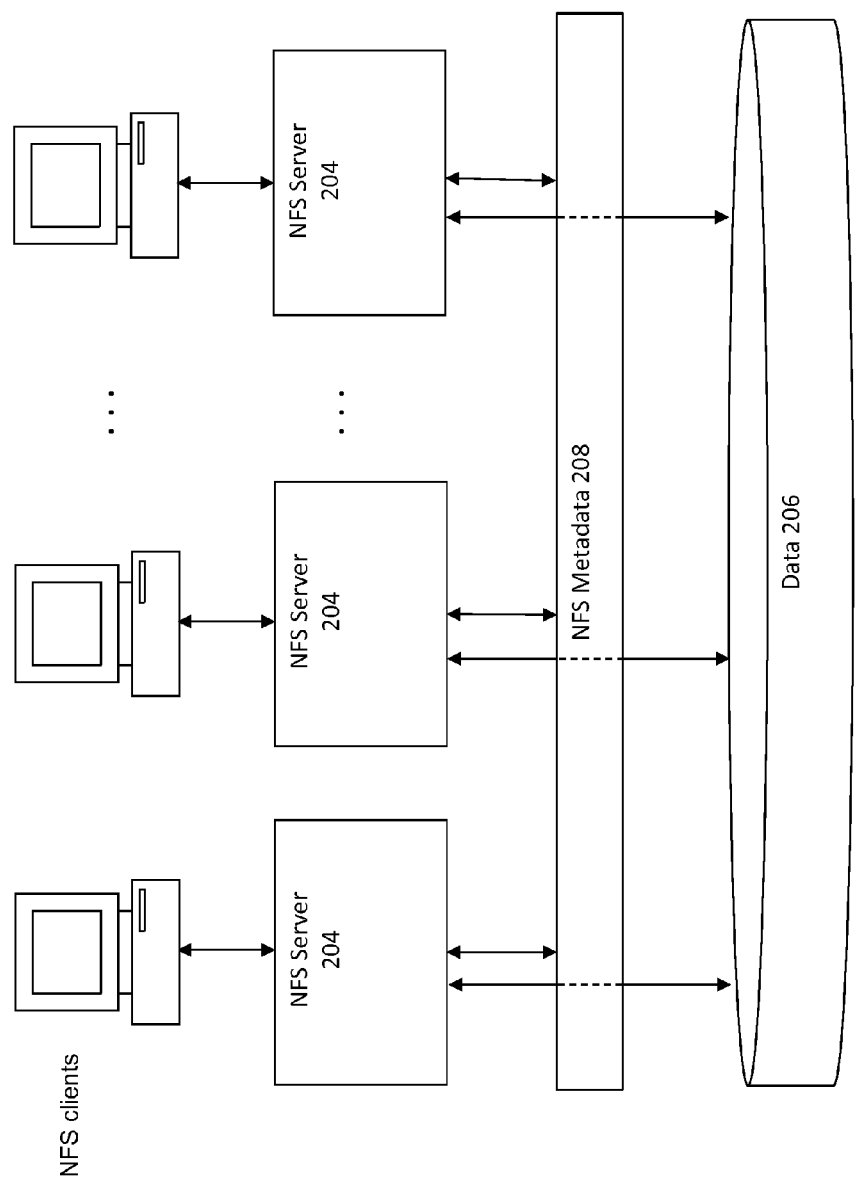
FIG. 3 illustrates a system having a distributed metadata server in accordance with some embodiments.

FIG. 3 illustrates a system having a distributed metadata server in accordance with some embodiments. Unlike the cluster illustrated in FIG. 2 that utilizes a single master metadata server 204-1, the illustrated cluster does not contain distinct master and slave servers. Instead, all servers 204 are able to both read and write to the metadata stored in metadata repository 208. In addition, the metadata is not sharded or partitioned, such that any server in the system is able to operate upon the entirety of the metadata. Thus, scalability is greatly improved by eliminating the bottleneck that occurs when requiring all updates to the metadata to be processed through a single master server. Also, due to the ability of each server to perform updates on the entirety of the metadata, the problems pertaining to load balancing and cross-partition operations that are common in partitioned metadata schemes can be avoided.

Figure 4A:
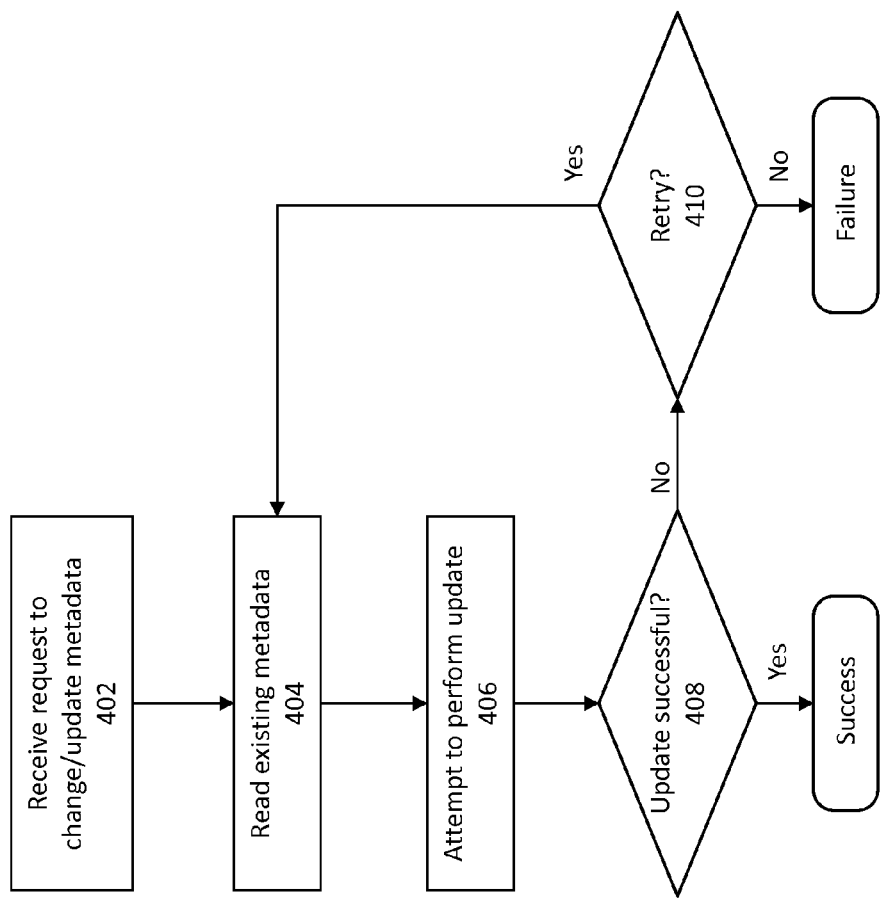
FIG. 4A illustrates a flowchart of a process for performing metadata updates using a distributed metadata server in accordance with some embodiments.

FIG. 4A illustrates a flowchart of a process for performing metadata updates using a distributed metadata server in accordance with some embodiments. At 402, a call specifying an operation to be performed on the metadata is received at a server in the cluster. The operation may be any operation that writes, updates, or changes metadata, such as creating new links between metadata inodes, removing or changing links, renaming inodes, etc. Unlike systems that use a single master metadata server, any server in the cluster may receive the call and can process the operation specified by the call itself, instead of having to forward the call to a specific master metadata server.

At 404, the server reads existing metadata associated with the call. In some embodiments, this comprises reading metadata associated with the metadata entity (e.g., a file inode or directory inode) to be created or modified by the call. For example, if the call is to create a new file (e.g., create a file inode), the server reads existing metadata corresponding to the directory that the new file is to be placed in (e.g., a parent directory inode). On the other hand, if the call is to move a file from one directory to another, inodes for the file to be moved, as well as for the source and destination directories, may be read.

At 406, the server attempts to perform an update on the metadata. For example, if the call was to create a new file, this may comprise creating a new inode corresponding to a new file, and updating the inode corresponding to the parent directory of the file in order to reflect the inclusion of the new file inode. If the call was to move an existing file from one directory to another, this may comprise updating the file inode and the source and destination directory inodes.

In some embodiments, if two or more existing inodes are to be updated (e.g., moving a file between different directories requires updates to both the source directory and the destination directory inodes), a first inode may be updated to include a proposed modification (specifying the update to be made), which is only implemented contingent upon a successful update of a subsequently updated inode. In some embodiments, when placing a proposed modification on an inode, the actual data of the inode does not change. The proposed modification can be used to roll back or roll forward the operation in the event of a failure, thus preserving the atomicity of the operation. The use of proposed modifications when updating multiple existing inodes in accordance with some embodiments is explained in greater detail below.

In some embodiments, in order to attempt to update an inode in the metadata, the inode is read from the metadata and compared to the corresponding metadata that was read earlier. If the metadata is the same as the earlier-read metadata, then it can be determined that no other server has updated the metadata in the intervening time, and the update can be processed. If however the metadata is different, indicating that the metadata has been updated by another server, then the update will be unsuccessful.

In some embodiments, in order to facilitate comparing the metadata to determine if an update has occurred, each inode maintains a version number that is incremented or otherwise updated whenever an update is performed on the inode. Thus, by comparing the version numbers of the inode read at two different times, it can be easily ascertained whether or not the inode was updated in the intervening time period.

By comparing the inode to be updated and only updating the inode if it can be determined that no other updates to the inode have occurred in the intervening time, requests to update a particular inode in the metadata are serialized. In systems where inode updates occur relatively infrequently, resources and processing power can be conserved due to the servers not having to acquire a lock prior to performing any updates on an inode.

At 408, the server checks to see if the update was successful. If the update is successful, then the user may be notified of the success of the operation. However, if the update was unsuccessful (e.g., due to the stored metadata no longer matching the earlier-read metadata), a determination may be made at 410 as to whether or not to retry the operation. In some embodiments, an unsuccessful update attempt may be retried a specified number of times. In addition or in the alternative, unsuccessful update attempts may be retried within a certain time period. If the operation is to be retried, the server returns to 404 to re-read the existing metadata. In some embodiments, retrying the operation may occur immediately, or after a specified period of time.

On the other hand, if the operation is not be retried, then the server may return a failure to the user. In addition, if any proposed modifications were made to particular inodes in the metadata, they may be rolled back or rolled forward.

Figure 4B:
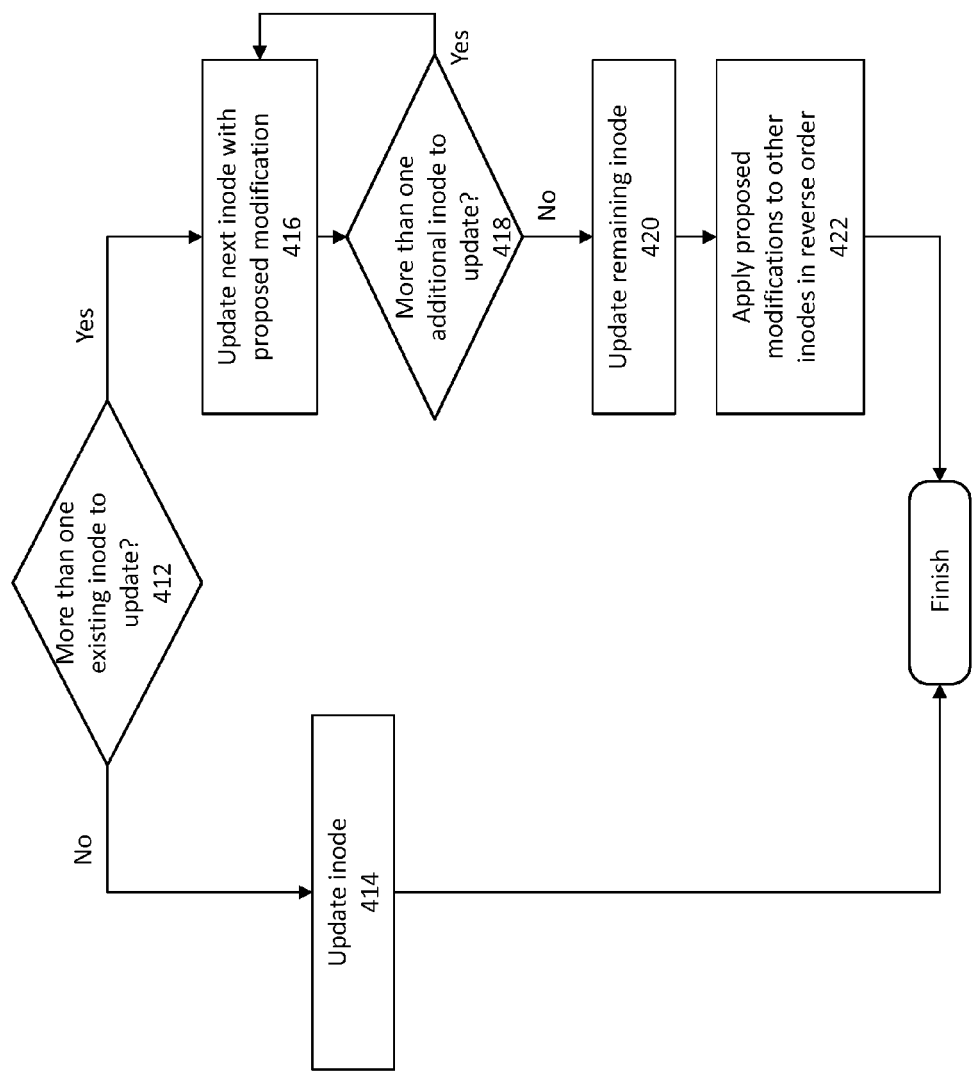
FIG. 4B illustrates a flowchart of a process for updating metadata in accordance with some embodiments

FIG. 4B illustrates a flowchart of a process for updating the metadata (as illustrated at 406 in FIG. 4A) in accordance with some embodiments. At 412, a determination is made as to whether more than one existing metadata entity (e.g., existing metadata inodes) needs to be updated in order to perform the requested operation. For example, if the operation is to create a new file inode in the metadata, only one existing metadata inode needs to be updated (e.g., the inode corresponding to the parent directory of the new file). However, for other types of operations, more than one existing metadata inode will have to be updated. For example, for move operations, the inode for the file to be moved, as well as the inodes corresponding to the source and destination directories may require updating.

In some embodiments, the distributed file system may contain specialized programs, modules, or tools configured to resolves issues that may arise with certain types of metadata inodes. Many file systems may use a garbage collector program or a file system checker program (hereinafter, collectively referred to as FSCK) to check for dangling file inodes (e.g., detecting and handling mismatches between the reference count of a file inode and the actual number of other inodes that point to or reference the file). For example, in an operation to delete a file inode, a parent directory inode of the file is updated to remove references to the file inode being deleted. However, the actual deletion of the file inode may be allowed to fail without consequence, as the FSCK can be used to later detect that there are no other inodes pointing to the file inode, and as a result remove the inode from metadata. Thus, in such embodiments, due to the ability of the FSCK to correct any errors that may occur when updating file inodes, file inodes may be excluded from the count at 412 for the purpose of determining the number of existing inodes needing to be updated. For example, if the operation involves updating one file inode and one directory inode, the number of inodes counted at 412 will be one.

If only one existing metadata inode needs to be updated, then at 414 the server will attempt to apply the update to the inode as described above. On the other hand, if more than one existing metadata inode needs to be updated, then at 416, a first metadata inode of the more than one metadata inodes is chosen and updated with a proposed modification, specifying the update to be made. For example, for a move file operation, the inode corresponding to the source directory of the file may be updated with a proposed modification, specifying that the file is to be moved from the source directory to the destination directory.

At 418, a determination is made as to whether there is more than one additional existing metadata inode to update. If there is more than one additional metadata inode to update, the process returns to 416, where another inode is chosen and updated with a proposed modification.

When there is only one remaining inode to update, then at 420, the last remaining metadata inode is updated normally. For example, in the above example of moving a file from a source directory to a destination directory, the destination directory inode may be updated to reference or point to the inode corresponding to the file.

At 422, if the update of the inode was successful, then the proposed modifications on the previous inodes are applied. For example, once the update of the destination directory inode is determined to be successful, the source directory inode (which currently contains a proposed modification) is updated in accordance with the proposed modification. In addition, the proposed modification will be removed from the source directory inode. In some embodiments, if proposed modifications were placed on more than one inode, they are applied and removed in reverse order from which they were placed.

However, if any of the above updates fail, the proposed modification placed on the inodes can be used to roll back or roll forward the operation from the point of failure. For example, if the update of the destination directory inode fails, the proposed modification of the source directory inode specifying the details of the operation can be used to either roll back the operation (e.g., verify that destination directory does not contain file inode), or to roll forward the operation (e.g., re-attempt the update of the destination directory inode).

The following sections describe specific types of metadata operations that may be performed in accordance with some embodiments.

Link Additions

Figure 5:
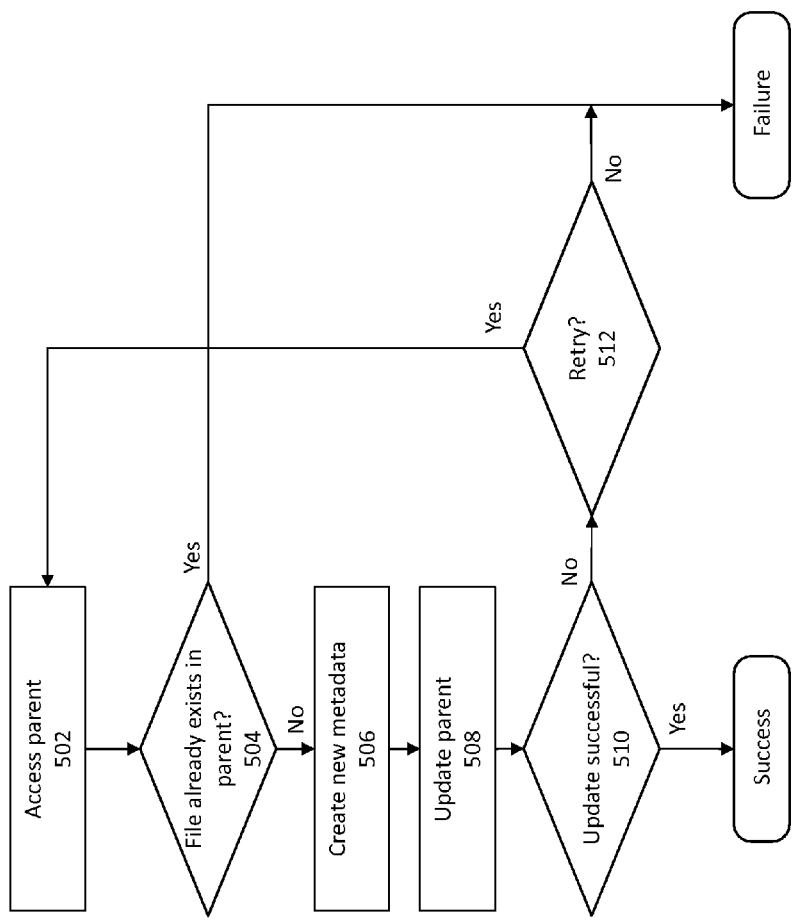
FIG. 5 illustrates a flowchart of a process for performing link addition using a distributed metadata server system in accordance with some embodiments.

FIG. 5 illustrates a flowchart of a process for performing link addition using a distributed metadata server system in accordance with some embodiments. Link addition operations may comprise CREATE operations (e.g., create a file to be placed in a parent directory), MKDIR operations (e.g., create a new directory), and/or SYMLINK operations (e.g., create a symbolic link between inodes in the namespace). For ease of explanation, FIGS. 6A-6E illustrate a process of creating a new file in a parent directory, in accordance with some embodiments.

At 502, when a call specifying a link addition operation is received, the server reads metadata corresponding to a parent directory associated with the operation. For example, as illustrated in FIG. 6A, a call is received specifying that a file "bar" is to be created in a parent directory "foo." In response, the server reads from the metadata an inode corresponding to the directory "foo."

Figure 6A:
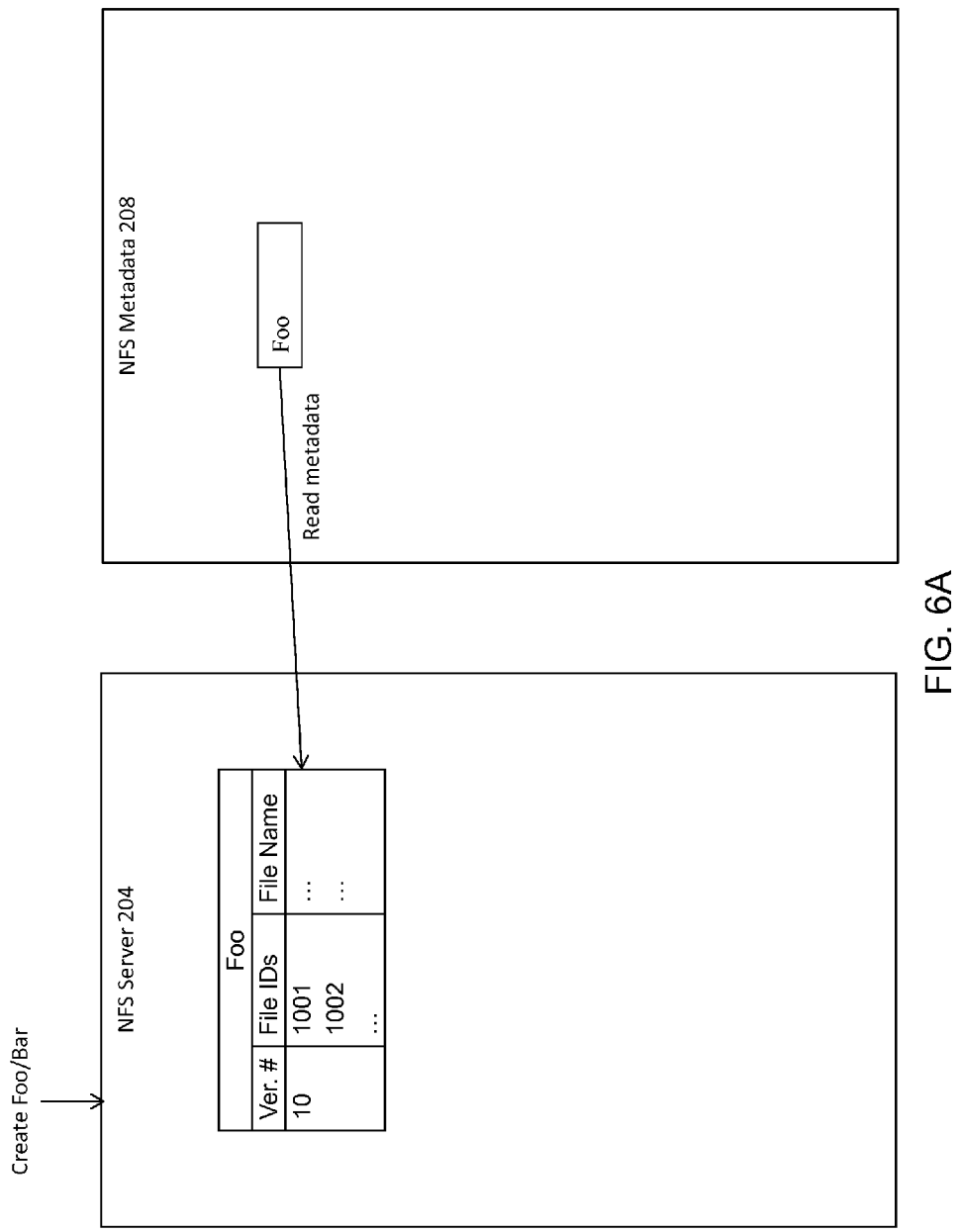
FIGS. 6A-6E illustrate a process of creating a new file in a parent directory, in accordance with some embodiments.

As illustrated in FIG. 6A, the directory inode for "foo" contains a version number of the directory, wherein the version number may be used to indicate an update history of the inode. In addition, the inode also contains information pertaining to the files and/or child directories that are stored in the directory. In some embodiments, each inode in the metadata is associated with an ID (e.g., a globally unique ID), and the directory inode contains a list of IDs corresponding to files and/or child directories contained in the directory. For example, parent directory "foo," at the time read by the server, has a version number of 10, and is associated with child inodes corresponding to the IDs 1001 and 1002.

At 504, the inode of the parent directory is checked to see if the link to be created already exists. For example, if the "foo" directory inode is found to already contain a link corresponding to a file named "bar", then the operation cannot be completed and a failure is returned. Similarly, if the parent directory inode is already associated with a directory inode to be created as party of a MKDIR operation, or a link associated with a SYMLINK operation, the operation cannot be completed. On the other hand, if the parent directory inode does not already contain the link to be created by the operation, then the operation can continue.

Figure 6B:
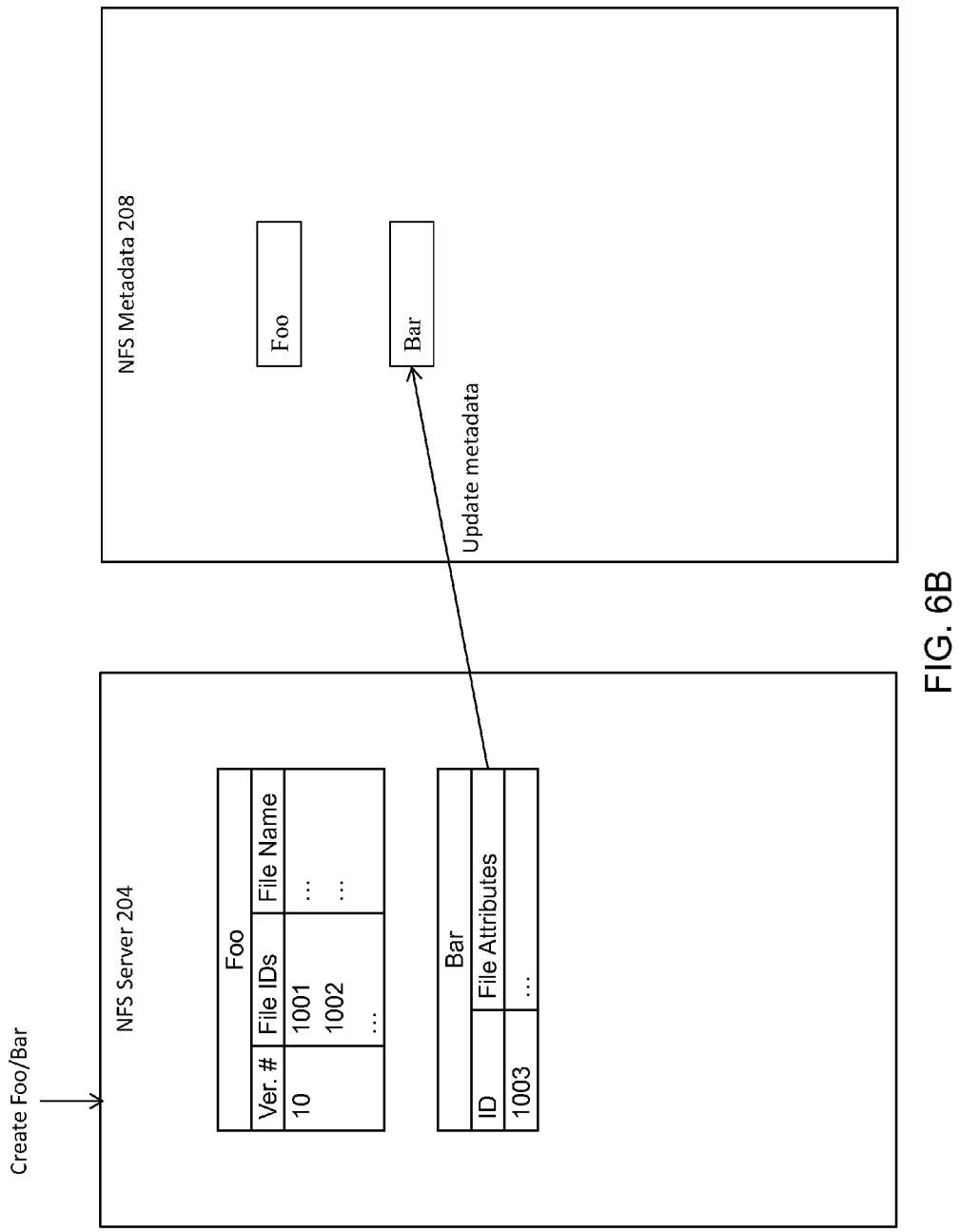

At 506, new metadata is created corresponding to the call (e.g., a new file inode for CREATE operations, a new directory inode for MKDIR operations, etc.). For example, as illustrated in FIG. 6B, the server creates a new inode corresponding the file "bar." The newly created file inode is assigned to a new ID number (e.g., 1003), and contains the attributes, ownership information, and/or other properties specified in the create operation. The new metadata (e.g., the "bar" inode) is then persisted from the server to storage (e.g., the metadata repository).

Figure 6C:
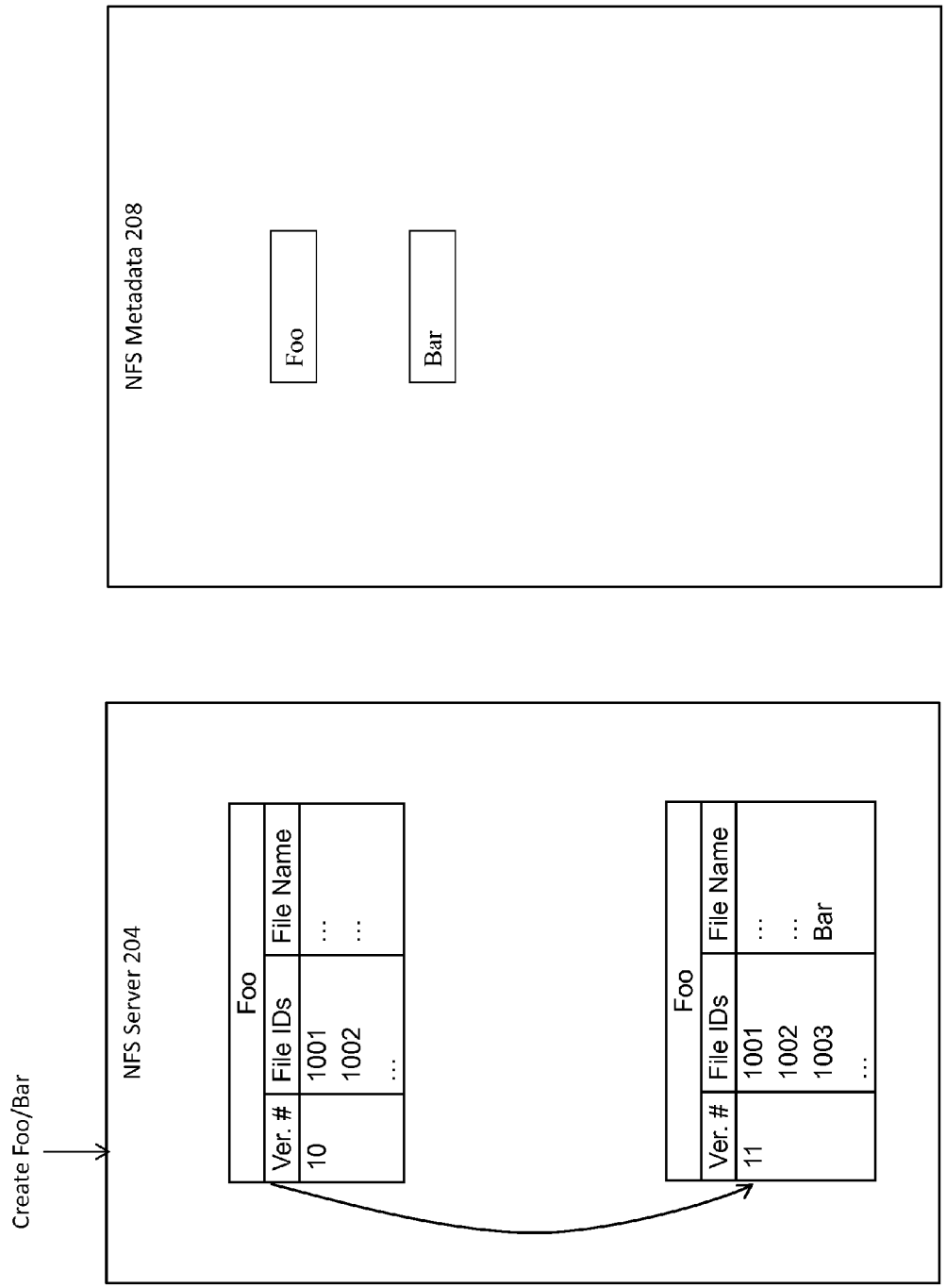

At 508, the server attempts to update the parent directory with the newly created metadata. For example, as illustrated in FIG. 6C, the server attempts to update the "foo" directory inode to include the "bar" file. For example, the update may comprise adding the inode ID of the "bar" file to the "foo" directory inode (e.g., adding inode ID 1003 to the list of inode IDs associated with the directory), and updating the version number of the "foo" directory inode (e.g., from 10 to 11).

Figure 6D:
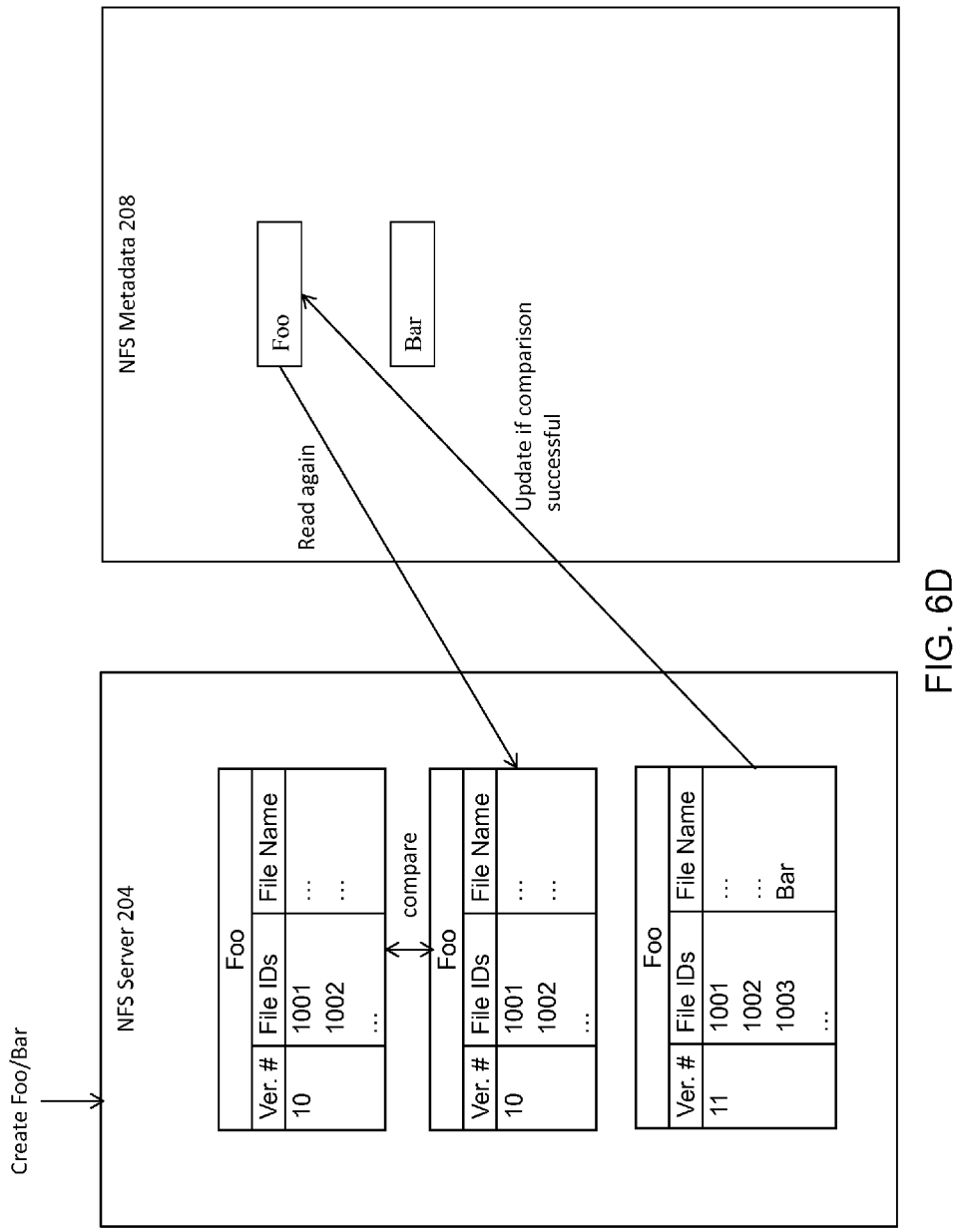

At 510, it is determined if the update can be successfully completed. In some embodiments, in order for the update to be performed, the server checks the parent inode (e.g., the "foo" directory inode) stored in the metadata. If the version number of the inode is the same as when retrieved earlier at 502, then it can be known that no other servers in the system have updated the inode since that time. The update can thus be completed successfully. For example, FIG. 6D illustrates the inode for the "foo" directory being read again from the metadata and being compared to the earlier read "foo" inode. Because the version numbers of the "foo" inodes are the same, indicating that no other server has updated the "foo" inode in the intervening time, the update can be performed successfully.

Figure 6E:
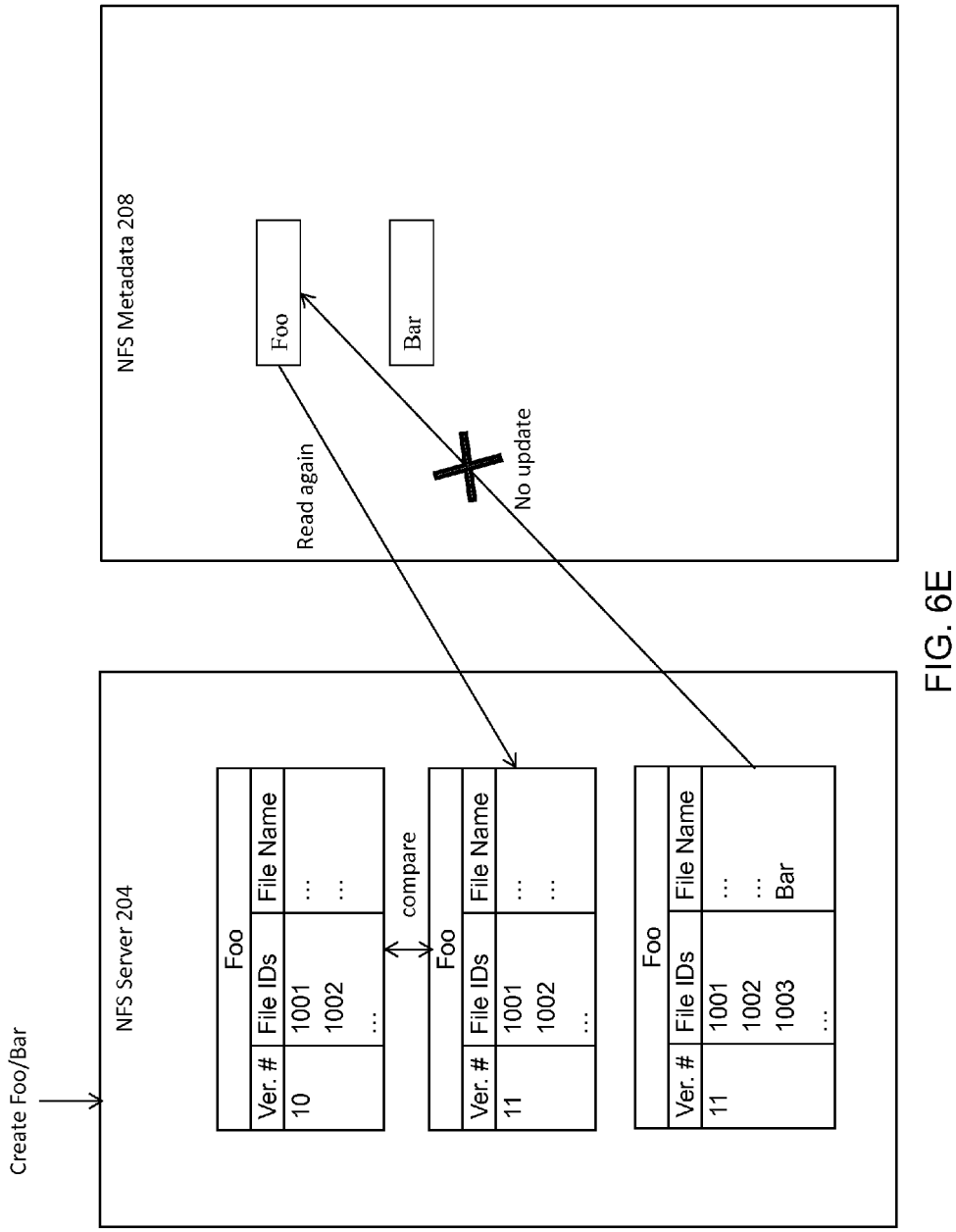

On the other hand, if the version number is different from the version number retrieved at 502, then it can be inferred that one or more other servers in the system have performed updates to the inode in the intervening time. Thus, the update will not be able to be completed. For example, FIG. 6E illustrates that the inode for the "foo" directory, when read again, has a different version number, indicating that another server has updated the inode. Therefore, the update cannot be completed.

If the update can be completed successfully, then the updated parent inode is written from the server into the metadata. In addition, a notification of success may be returned to a user.

On the other hand, if the update cannot be completed successfully (e.g., the version number of "foo" is different from when the server originally read it), a determination is made at 512 as to whether or not to retry the operation. In some embodiments, the parent directory inode is read again to determine if the link already exists within the directory (e.g., if the "foo" directory inode already contains a "bar" file). If the link already exists, then a failure is returned. In addition, the existing inode in the parent directory may also be returned to the user. On the other hand, if the link does not already exist, then the server may attempt to update the parent directory inode again. In some embodiments, the server may create new metadata for updating the parent directory inode (e.g., a new "bar" file inode, having a new ID), while in other embodiments, the previously created metadata ("bar" file inode) may be reused when retrying the operation.

In cases where the created inode is not used (e.g., it is discovered after the inode is created that the parent directory already points to or references an inode with the same name), then a cleanup operation may be called to delete the created inode. In other embodiments, instead of cleaning immediately after the failed operation, a FSCK may be used that periodically performs garbage collection (e.g., clean up any inodes that do not have parent inodes).

In some embodiments, a number of inodes may be pre-allocated in the memory. This allows for a parallel update of inodes with user attributes and directory entry updates, instead of having to first create the inode before updating the directory. Because the updates of the parent directory and inode can be performed in parallel as a single phase operation, the amount of metadata latency can be significantly reduced.

Hard Links

Figure 7:
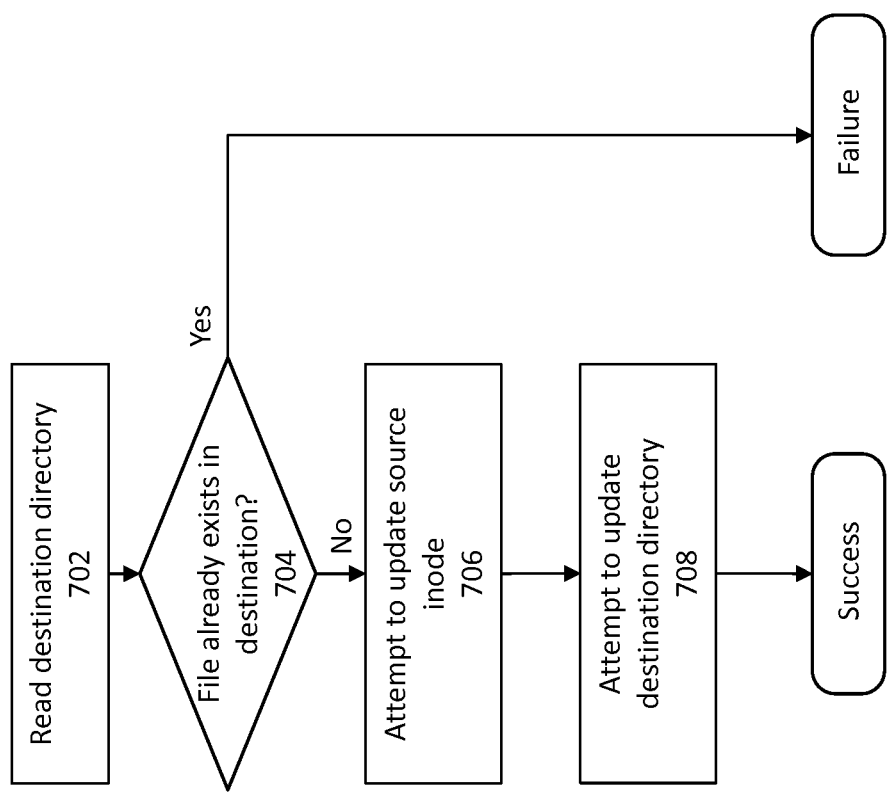
FIG. 7 illustrates a flow chart for creating hard links using a distributed metadata server system in accordance with some embodiments.

FIG. 7 illustrates a flow chart for creating hard links using a distributed metadata server system in accordance with some embodiments. In some embodiments, the operation specifies a source inode, a destination directory, and a filename. For example, a hard link operation may specify to create a file "B" (filename) in a directory "A" (destination directory) that links to an existing file "bar" located in a directory "foo" (source inode). In some embodiments, when the operation is completed, the inode corresponding to the "bar" file will have a reference count that is incremented by 1, indicating that an additional file ("B") now references the inode.

At 702, the destination directory is read from the metadata. The destination directory is checked to see if it already contains a file matching the specified filename at 704. If such a file already exists, then the request may be rejected. For example, if the directory "A" already contains a file "B," then the request may be rejected.

At 706, the source inode is retrieved, and updated. For example, this may comprise reading the inode for the "foo" directory to retrieve the "bar" file inode. In embodiments that do not use a FSCK, a proposed modification may be placed on the inode, describing the operation to be performed. On the other hand, in systems using a FSCK, the source inode may be updated directly without the need for a proposed modification. In such cases, the "bar" file inode is updated by incrementing the reference count of the inode, as well as the version number (indicating that an update has been performed on the inode). In embodiments where file inodes also contain references to their parent inode, the "bar" file inode may also be updated to reference the additional parent inode (the "A" directory).

If the update of the source inode fails, a determination is made as to whether to retry the operation. If the operation is to be retried, the destination directory may be read to see if the filename exists (e.g., read directory "A" to see if file "B" exists in the directory). If the filename does not exist, another attempt may be made to update the source inode (e.g., update the "bar" inode). If the filename does exist, the request is rejected.

On the other hand, if the update of the source inode is successful, then at 708 the destination directory is updated. For example, once the "bar" inode has been successfully updated, directory "A" is updated to contain a file "B" that corresponds to the inode for "bar." If the update is successful, then an indication of success may be returned to the user. In addition, if the proposed modification was placed on the source inode at 706, it may be applied and removed from the source inode. On the other hand, if the update is unsuccessful, an indication of failure may be returned, or the update may be reattempted at a later time.

Because attempts to update an inode within the metadata requires first reading the inode just prior to update to determine if the update can be performed, operations upon the metadata will be serialized. Thus, if a first server is attempting to create a hard link to an inode concurrently with a second server attempting to delete the inode, the creation of the hard link may succeed or fail based upon the reference count of the source inode based on the delete operation.

Link Removal

Figure 8:
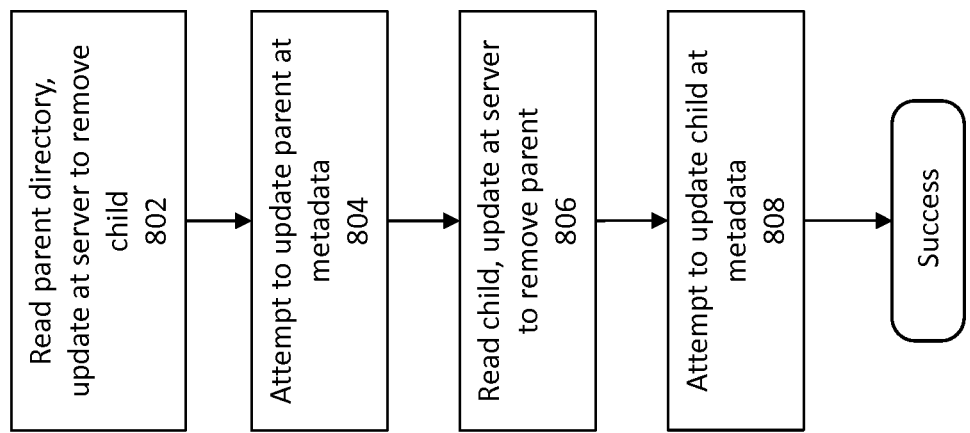
FIG. 8 illustrates a flow chart for performing link removal in accordance with some embodiments.

FIG. 8 illustrates a flow chart for performing link removal in accordance with some embodiments. Link removal operations may comprise REMOVE operations (e.g., remove a specified file) and/or RMDIR operations (e.g., remove a specified directory). For example, a link removal operation may specify a file or directory inode (e.g., "bar") corresponding to the file or directory to be removed, and a parent directory inode (e.g., "foo") corresponding to a directory that the file is located within.

At 802, after the remove request is received, the inode corresponding to a parent directory is read from the metadata (e.g., the "foo" directory inode). The retrieved directory inode is then updated at the server by removing references or pointers to the file inode. For example, the "foo" directory inode may contain a list of inode IDs corresponding to inodes contained within the directory, and the update comprises removing an inode ID corresponding to "bar" from the list. Alternatively, if the system does not use a FSCK, a proposed modification specifying an update to be performed is placed on the inode instead of an actual update being performed.

At 804, the server attempts to update the parent directory inode in the stored metadata. If the update is successful, the operation proceeds to 806. Otherwise, the operation fails. In some embodiments, if the update is unsuccessful, it may be reattempted at a later time.

At 806, if the update of the directory inode is successful, the file inode (e.g., the "bar" inode) is read and updated to decrement a reference count of the inode. At 808, the updated file inode is used to update the metadata. In addition, if a proposed modification was placed on the parent directory inode earlier, the proposed modification is applied and removed.

If the reference count of the inode is now zero, then the inode may be removed. Alternatively, the file inode may not be removed from the metadata immediately, to be instead removed by a FSCK at a later time. In addition, if the update of the file inode fails, the operation as a whole may still be considered successful, because the FSCK can detect a mismatch between the reference count of the file inode and the number of other inodes actually referencing the file inode, and act accordingly.

Rename/Move Operation

A rename or move operation specifies a file inode, a source directory, and a destination directory. Due to such operations potentially requiring the modification of two or more inodes in the metadata, proposed modifications are used in order to facilitate recovery in the event of a crash or failure. In some rename operations, the source and destination directories may be the same, in which case a proposed modification may not be required.

Figure 9:
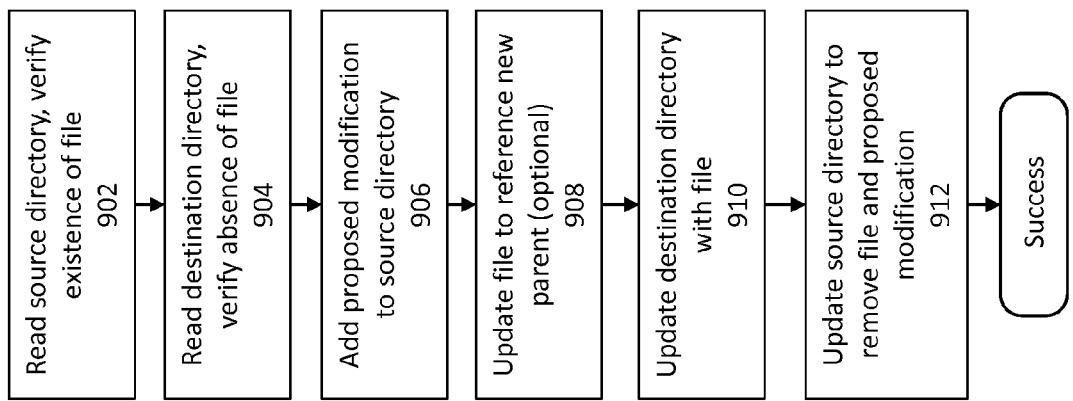
FIG. 9 illustrates a flowchart for performing a rename operation in accordance with some embodiments.

FIG. 9 illustrates a flowchart for performing a rename or move operation in accordance with some embodiments. For example, a rename operation may comprise specifying a movement of a file between two different directories (e.g., moving a file "B" from directory "A" to directory "foo," and renaming it "bar").

At 902, the source directory (e.g., "A") is read in order to verify that target file ("B") exists. If not, the request is rejected. Similarly, at 904, the destination directory inode (e.g., "foo") is read by the server and checked to see if it already contains a file having the same name as the proposed rename ("bar"). If so, the request is rejected.

Because both the source and destination directory inodes will be updated during the course of the operation, proposed modifications are used in order to preserve the atomicity of the operation. A proposed modification is added to the inode corresponding to the source or destination directory, and is only implemented if an update on the other directory is successful. In some embodiments, the proposed modification is added to the source directory inode, in order to ensure that at least one directory always references the file inode, thus preventing dangling files.

For example, in accordance with some embodiments, at 906, a proposed modification is made to the source directory. This may comprise updating the version number of the source directory, and appending the proposed modification. In some embodiments, the proposed modification includes complete information on the operation (e.g., move file "B" from directory "A" to directory "foo," and rename as "bar"). In some embodiments, updating an inode with proposed modification does not change the actual data of the inode.

Updating the inode with a proposed modification functions in essence as a soft lock. If two or more operations to move a file are executed concurrently, only one will be able to successfully update the inode with the proposed modification, while the other will fail. In some embodiments, if two or more proposed modifications are non-conflicting (e.g., directed to moving different files in the directory), then they may both be able to update the inode. If the inode is unable to be updated to include the proposed modification (e.g., due to another server performing an update on the inode in the intervening time), the update may be reattempted.

Once the source directory inode has been updated to include a proposed modification, if a crash or failure occurs, a server that later reads the source directory inode will be able to see the proposed modification. The server may then read the destination inode. If the destination inode does not reference the file inode, then it can be determined that the operation failed, and the proposed modification can be removed from the inode, in effect rolling back the operation. Alternatively, the instructions contained within the proposed modification can also be used to attempt to retry or roll forward the operation.

In some embodiments, at 908, the file inode may also be updated. For example, the name of the file or other attributes of the file may be changed. In addition, in some systems, each file inode contains a reference to its parent inode, and the update would comprise updating the file inode with its new parent inode (the destination directory). If a crash or failure occurs at this point, a server that later reads the destination directory inode will not find the file inode (since the destination inode has not yet been updated to include the file inode). However, a server that reads the source directory inode will see the proposed modification describing the operation, which can be used to roll the operation forward or back. Alternatively, if file inodes in the system contain references to their parent inodes, a server that reads the file inode will see that the file inode references the destination inode, allowing the operation to be rolled forward or rolled back.

At 910, the destination inode is updated with the new file inode. If a crash or failure occurs at this point, a read of the source directory will find the proposed modification. From the proposed modification, the destination inode can be determined, and a determination can be made as to whether to roll forward or roll back the operation. For example, if the file inode is not present at the destination inode, then it can be added to the destination inode and removed from the source inode, thus rolling forward the operation. In addition, the proposed modification is also removed from the source inode.

At 912, if the above updates have all been successful, then the source directory inode is updated to remove the file inode. In addition, the proposed modification is also removed from the source directory inode.

It is noted that the above approach to use proposed modifications/updates may be employed in other situations as well. For example, this approach may be applicable to other types of operations that involve modifications of two or more inodes in the metadata.

Therefore, what has been described is an improved architecture for implementing a distributed metadata server in a virtualization environment. By allowing any server in the system to operate upon the entirety of the metadata, scalability is greatly improved by eliminating potential bottlenecks that occur when all operations on metadata are passed through a single metadata master server. In addition, by reading and comparing the metadata prior to updating and using proposed modifications when attempting to update multiple metadata entities, data consistency can be maintained without the server needing to acquire a lock in order to modify or update the metadata.

System Architecture

Figure 10:
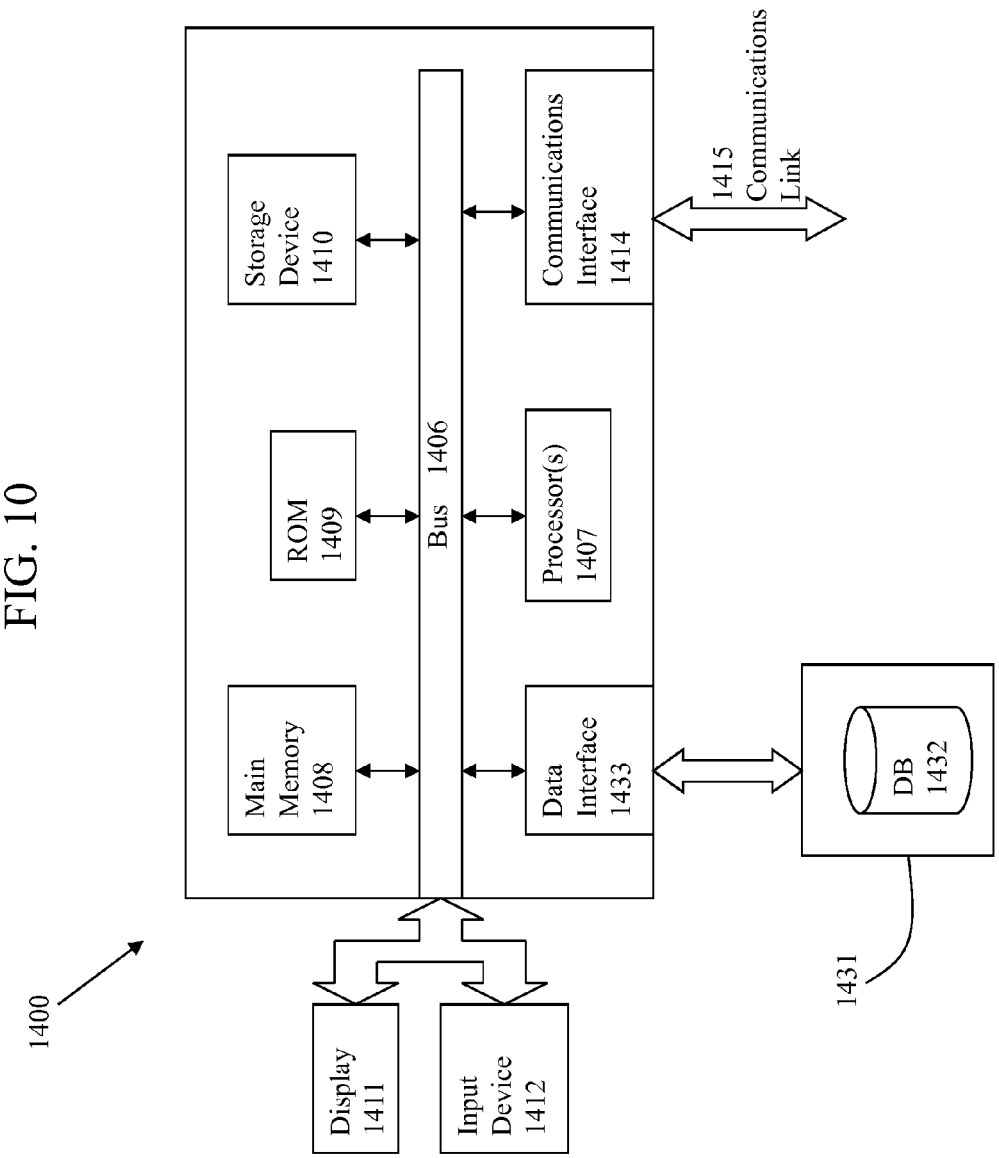
FIG. 10 illustrates a block diagram of a computing system suitable for implementing an embodiment of the present invention.

FIG. 10 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. A database 1432 in a storage medium 1431 may be used to store data accessible by the system 1400.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer-implemented method for operating upon distributed metadata in a distributed file system environment, comprising:

maintaining a plurality of servers in a distributed file system environment, wherein the distributed file system comprises data correlating to metadata distributed across the plurality of servers;

receiving, at a server of the plurality of servers, a request to perform an operation on metadata stored in a metadata repository of the distributed file system environment;

reading, by the server, the metadata from the metadata repository associated with the received request;

attempting, by the server, to update the metadata at the metadata repository corresponding to the metadata read from the metadata repository, based at least in part upon the received request, wherein attempting to update the metadata at the metadata repository comprises:
retrieving the metadata from the metadata repository, comparing newly retrieved metadata to originally retrieved metadata, and
updating the metadata at the metadata repository only if the newly retrieved metadata matches the originally retrieved metadata; and in response to an unsuccessful attempt to update the metadata at the metadata repository, executing a garbage collection at a later time to remove metadata entities that lack a valid parent metadata entity by detecting inconsistencies between a reference count of metadata corresponding to a file and an actual number of other metadata entities that reference the file.

2. The method of claim 1, wherein the distributed file system is implemented as part of a virtualization environment.

3. The method of claim 2, wherein the virtualization environment comprises a cluster of one or more servers, and wherein the request may be received and processed by any server of the one or more servers.

4. The method of claim 1, wherein the request comprises a request to create a new file.

5. The method of claim 1, wherein the retrieved metadata corresponds to a parent directory of a metadata entity to be modified by the operation.

6. The method of claim 1, wherein the request comprises a request to move a file from a source directory to a destination directory, and wherein the retrieved metadata corresponds to metadata for the source directory and the destination directory.

7. The method of claim 1, wherein retrieved metadata corresponds to at least a first and a second metadata entity, and attempting to update the metadata at the metadata repository comprises attempting to update the first metadata entity with a proposed modification prior to attempting to update the second metadata entity.

8. The method of claim 7, further comprising applying the proposed modification to the first metadata entity in response to a successful update of the second metadata entity.

9. The method of claim 7, wherein the proposed modification is used to roll back or roll forward the operation in response to an unsuccessful attempt to update the second metadata entity.

10. The method of claim 1, wherein attempting to update the metadata at the metadata repository does not comprise obtaining a lock on the metadata.

11. The method of claim 1, wherein in response to an unsuccessful attempt to update the metadata at the metadata repository, re-attempting to update the metadata at the metadata repository at a later time.

12. A system for operating upon distributed metadata in a distributed file system environment, comprising:
- a computer processor to execute a set of program code instructions; and
- a memory to hold the program code instructions, in which the program code instructions comprises program code to perform,
    - maintaining a plurality of servers in a distributed file system environment, wherein the distributed file system comprises data correlating to metadata distributed across the plurality of servers;
    - receiving, at a server of the plurality of servers, a request to perform an operation on metadata stored in a metadata repository of the distributed file system environment;
    - reading, by the server, the metadata from the metadata repository associated with the received request;
    - attempting, by the server, to update the metadata at the metadata repository corresponding to the metadata read from the metadata repository, based at least in part upon the received request, wherein attempting to update the metadata at the metadata repository comprises:
        - retrieving the metadata from the metadata repository,
        - comparing newly retrieved metadata to originally retrieved metadata, and
        - updating the metadata at the metadata repository only if the newly retrieved metadata matches the originally retrieved metadata; and
    - in response to an unsuccessful attempt to update the metadata at the metadata repository, executing a garbage collection at a later time to remove metadata entities that lack a valid parent metadata entity by detecting inconsistencies between a reference count of metadata corresponding to a file and an actual number of other metadata entities that reference the file.

13. The system of claim 12, wherein the distributed file system is implemented as part of a virtualization environment.

14. The system of claim 13, wherein the virtualization environment comprises a cluster of one or more servers, and wherein the request may be received and processed by any server of the one or more servers.

15. The system of claim 12, wherein the request comprises a request to create a new file.

16. The system of claim 12, wherein the retrieved metadata corresponds to a parent directory of a metadata entity to be modified by the operation.

17. The system of claim 12, wherein the request comprises a request to move a file from a source directory to a destination directory, and wherein the retrieved metadata corresponds to metadata for the source directory and the destination directory.

18. The system of claim 12, wherein retrieved metadata corresponds to at least a first and a second metadata entity, and attempting to update the metadata at the metadata repository comprises attempting to update the first metadata entity with a proposed modification prior to attempting to update the second metadata entity.

19. The system of claim 18, wherein the proposed modification is applied to the first metadata entity in response to a successful update of the second metadata entity.

20. The system of claim 18, wherein the proposed modification is used to roll back or roll forward the operation in response to an unsuccessful attempt to update the second metadata entity.

21. The system of claim 12, wherein attempting to update the metadata at the metadata repository does not comprise obtaining a lock on the metadata.

22. The system of claim 12, wherein in response to an unsuccessful attempt to update the metadata at the metadata repository, re-attempting to update the metadata at the metadata repository at a later time.

23. A computer program product embodied in a non-transitory computer readable medium, the computer readable medium having stored thereon a sequence of instructions which, when executed by a processor causes the processor to execute a process for operating upon distributed metadata in a distributed file system environment, comprising:
- maintaining a plurality of servers in a distributed file system environment, wherein the distributed file system comprises data correlating to metadata distributed across the plurality of servers;
- receiving, at a server of the plurality of servers, a request to perform an operation on metadata stored in a metadata repository of the distributed file system environment;
- reading, by the server, the metadata from the metadata repository associated with the received request;
- attempting, by the server, to update the metadata at the metadata repository corresponding to the metadata read from the metadata repository, based at least in part upon the received request, wherein attempting to update the metadata at the metadata repository comprises:
    - retrieving the metadata from the metadata repository,
    - comparing newly retrieved metadata to originally retrieved metadata, and
    - updating the metadata at the metadata repository only if the newly retrieved metadata matches the originally retrieved metadata; and
- in response to an unsuccessful attempt to update the metadata at the metadata repository, executing a garbage collection at a later time to remove metadata entities that lack a valid parent metadata entity by detecting inconsistencies between a reference count of metadata corresponding to a file and an actual number of other metadata entities that reference the file.

24. The computer program product of claim 23, wherein the distributed file system is implemented as part of a virtualization environment.

25. The computer program product of claim 24, wherein the virtualization environment comprises a cluster of one or more servers, and wherein the request may be received and processed by any server of the one or more servers.

26. The computer program product of claim 23, wherein the request comprises a request to create a new file.

27. The computer program product of claim 23, wherein the retrieved metadata corresponds to a parent directory of a metadata entity to be modified by the operation.

28. The computer program product of claim 23, wherein the request comprises a request to move a file from a source directory to a destination directory, and wherein the retrieved metadata corresponds to metadata for the source directory and the destination directory.

29. The computer program product of claim 23, wherein retrieved metadata corresponds to at least a first and a second metadata entity, and attempting to update the metadata at the metadata repository comprises attempting to update the first metadata entity with a proposed modification prior to attempting to update the second metadata entity.

30. The computer program product of claim 29, wherein the proposed modification is applied to the first metadata entity in response to a successful update of the second metadata entity.

31. The computer program product of claim 29, wherein the proposed modification is used to roll back or roll forward the operation in response to an unsuccessful attempt to update the second metadata entity.

32. The computer program product of claim 23, wherein attempting to update the metadata at the metadata repository does not comprise obtaining a lock on the metadata.

33. The computer program product of claim 23, wherein in response to an unsuccessful attempt to update the metadata at the metadata repository, re-attempting to update the metadata at the metadata repository at a later time.

* * * * *